UNITED STATES PATENT OFFICE.

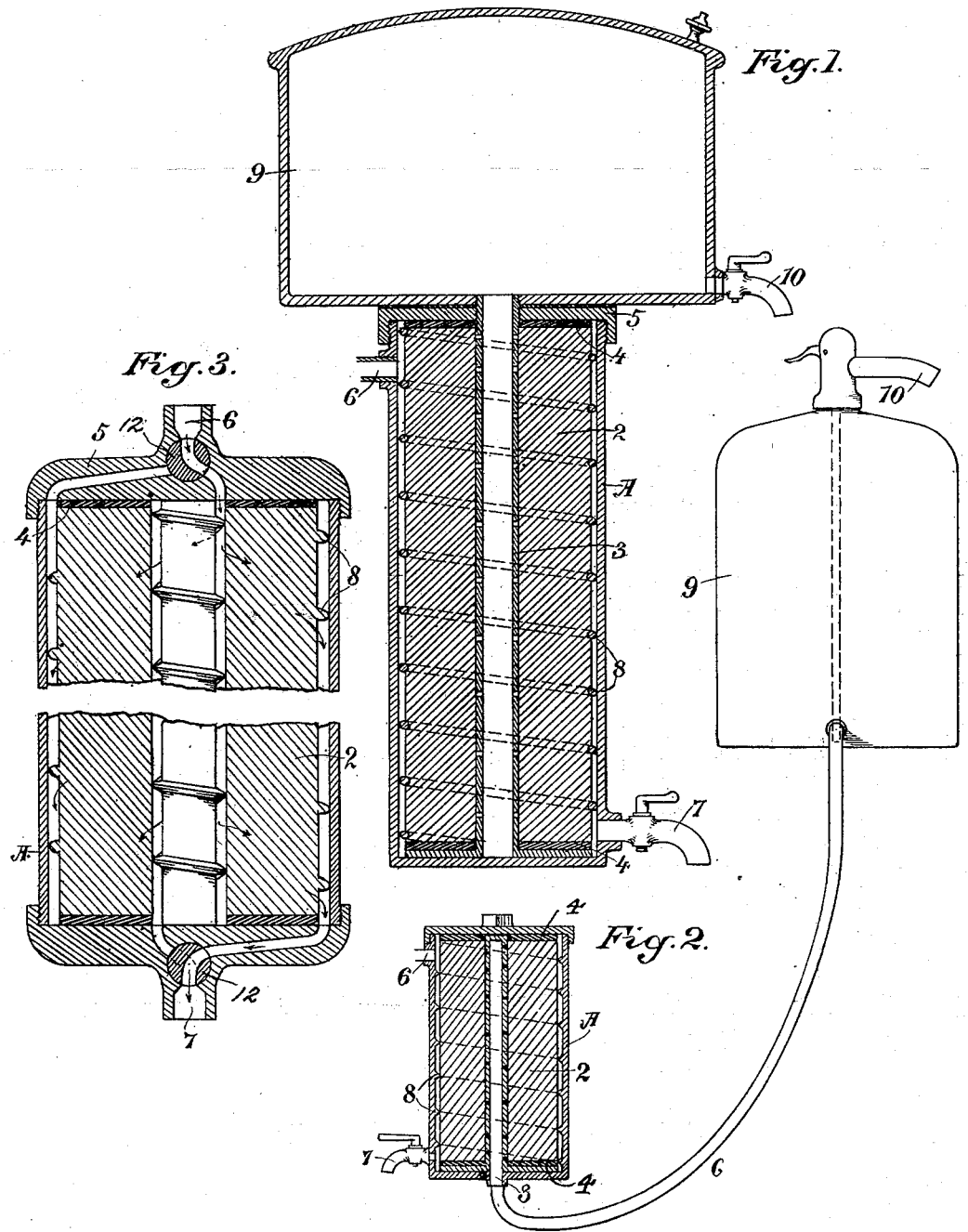

RUDOLPH C. REED, OF SAN FRANCISCO, CALIFORNIA, ASSIGNOR OF TWO-THIRDS TO HERMANN ZADIG AND MOSES BLUM, OF SAME PLACE.

SELF-CLEANING FILTER.

SPECIFICATION forming part of Letters Patent No. 647,682, dated April 17, 1900.

Application filed November 23, 1899. Serial No. 737,981. (No model.)

*To all whom it may concern:*

Be it known that I, RUDOLPH C. REED, a citizen of the United States, residing in the city and county of San Francisco, State of California, have invented an Improvement in Self-Cleaning Filters; and I hereby declare the following to be a full, clear, and exact description of the same.

My invention relates to a filtering apparatus; and it has for its object such a construction of filter that unfiltered water can be drawn directly through the apparatus or the water may be filtered and stored for use, and the flow of water through the filter may be reversed in conjunction with a direct cleansing flow over the surface to be cleaned.

My invention consists of a casing, a hollow porous filter fixed therein, so as to leave a surrounding annular space in which spirally-disposed ribs or flanges carried by and removable with the filter are interposed, so that a flow of water is made to follow the spirals around the periphery of the filter from the inlet to the discharge when desired. Through the interior of the filter passes a perforated pipe, one end of which is connected with a discharge and through this with a reservoir in which the filtered water is stored and subjected to air-pressure, which aerates and assists in discharging it when drawn, and it also serves to flush the filtered water through the walls of the filter to the outside when the direct-discharge cock is opened to assist in cleansing the filter.

My invention also comprises details of construction which will be more fully explained by reference to the accompanying drawings, in which—

Figure 1 is a sectional view of the filter and the vessel for containing filtered water. Fig. 2 shows another form of the apparatus. Fig. 3 is a view of the filter with exterior and interior spiral ribs and constructed to be reversed.

A is the filter-case, which may be made of metal or other material of any suitable or desired size and preferably cylindrical in form. Within this is a filter 2, which may be made of porous stone or other suitable porous filtering material, of the same shape as the outer case and of sufficiently-smaller diameter to leave an annular channel around it when it is in position. This filter is tubular, and through the interior a loosely-fitting perforated pipe or column 3 passes from end to end of the outer chamber. The ends of the filter 2 abut against suitable washers 4, and a cap 5 screws or is otherwise secured upon the end of the casing, so as to fit snugly and hold all the parts in position.

As shown in Fig. 1, the filtering is designed to take place from the outside to the inside of the filter, and in this construction a supply-pipe 6 opens into the outer chamber near the top, and a discharge-faucet 7 connects with it near the bottom, both opening into the annular space which surrounds the filter.

Between the filter and the interior of the case a spiral channel is formed which passes many times around the filter. This channel is formed by ribs 8, which fit snugly between the filter and the casing. These ribs may be formed or secured to the interior of the casing or by a flexible substance coiled around the exterior of the filter, so that the filter and the spiral ribs may be introduced to or withdrawn from the casing together. The object of this spiral channel is to cause the water which flows from the supply-pipe 6 to the discharge-faucet 7 to pass around the filter, following the spiral channel, and thus wash off the exterior of the filter whenever water is drawn.

When water is to be used for ordinary purposes, in which filtering is not required, it will be seen that when the faucet 7 is opened the water will flow around the spiral channel and be discharged through the faucet. At the same time the current will be so rapid as to continually wash off the surface of the filter and prevent the adherence of sediment or other matter which might foul the filter.

When the faucet 7 is closed, there will be a sufficient pressure of water within the casing to gradually force itself through the walls of the filtering material 2, and the water which thus percolates through the filter passes through the holes in the interior pipe or passage 3, and from this pipe it is conveyed into the receiver 9. This receiver is so constructed that air would be contained in the upper part or in connection therewith, and as the water which enters this receiver under the pressure due to the head of the supply will compress the air in the upper part of the receiver to an extent equal to the pressure by which the water is forced into the receiver there will always be an air-pressure, so that when the discharge cock or faucet 10 is opened the filtered water will be discharged with considerable force.

Whenever the cock 7 is opened, the air-pressure within the receiver tends to force the filtered water through the pipe 3 and outwardly through the walls of the filter, because while this faucet 7 is open the water is running freely through the spiral passage around the filter and with little or no pressure upon its surface; but the water stored under pressure will tend to force its way out through the filter-walls, and this, in conjunction with the current passing around the outside, will thoroughly cleanse the filter whenever the faucet 7 is opened. The filter is thus maintained in a clean condition, and experience has shown that when used in waters heavily charged with fine clay sediment, which ordinarily clogs all filters, this one will be kept sufficiently clean, and filtered water can always be obtained from it.

As shown in Fig. 1, the discharge from the central pipe 3 is upwardly. As shown in Fig. 2, the discharge is connected with the bottom and may be conveyed by a pipe of any suitable length to the receiver 9, which may thus be placed at a considerable distance from the filter.

If desired, the flow of water through the apparatus may be reversed from that shown in Fig. 1—that is, the supply of water is delivered into the center of the filter and discharges outwardly through the filter 2, thence flowing around the annular chamber exterior to the filter to the discharge-pipe which leads to the receiver and which in this case would connect with this outside chamber. When constructed in this manner, the spirally-disposed ribs would pass between the inner tube and the interior of the tubular filter, as the inner surface would be the one to be cleansed in such a construction.

By using spiral ribs 8 interior and exterior to the filter and using suitable connecting-pipes and cocks 12 the inlet-water may be delivered either outside or inside the filter and the apparatus made reversible, as shown in Fig. 3.

Having thus described my invention, what I claim as new, and desire to secure by Letters Patent, is—

1. A tubular filter comprising an exterior case having an annular space between itself and the outside of the filter, spirally-disposed ribs carried by the filter and removable therewith, and extending from top to bottom of said space and forming a channel through which water under pressure flows in contact with the filter-surface, a supply connecting with one end of said channel and a discharge with the other, a central column within the filter and connections through which filtered water is withdrawn therefrom.

2. A filter comprising an exterior case, a tubular porous filter fixed therein, with an annular space and spirally-disposed ribs surrounding the filter, a supply-pipe connecting with the upper end of the spiral channel thus formed, a discharge-faucet connecting with the lower end, an interior perforated pipe to receive the water forced through the filter during the time when the exterior discharge-cock is closed, a receiver into which the filtered water under pressure is forced, said receiver having an air-chamber formed or connected with the upper part thereof and a draw-off cock or passage opening into the lower part.

3. A self-cleansing filter consisting of an exterior case, with supply-passage at the top through which water is admitted under pressure, a tubular porous filter fitting within the case, ribs surrounding said filter, forming a spiral channel through which water from the supply-passage flows, a perforated tube fitting loosely within the filter, and connecting with an air-chambered receiver into which filtered water is forced under pressure, a discharge-passage connecting with the exterior spiral chamber through which water may be drawn directly to relieve pressure upon the outside of the filter whereby the air-pressure from the receiver will force filtered water outwardly through the walls of the filter during the flow through the spiral channel.

4. A filter including an exterior case, a centrally-disposed column and a tubular filter of porous material fitting between said case and column, a water supply and discharge at opposite portions of the tubular filter and means carried by and removable with the filter whereby water is caused to travel along said filter in spiral lines and thereby cleanse the surface over which it passes.

5. A filter including an exterior case, a centrally-disposed column, a tubular body of filtering material within the case and means carried by and removable with the filter and including spiral ribs forming a channel along which the water flows in spiral lines to automatically maintain the filter-surface clean, means for supplying water to one end of the spiral passage and means whereby the water may be withdrawn from said passage.

6. A filter including a tubular filtering medium, an inclosing case therefor, a spiral passage formed about and removable with the filter-surface and along which the water flows to automatically cleanse said surface, and means for admitting water to and discharging it from said passage.

In witness whereof I have hereunto set my hand.

RUDOLPH C. REED.

Witnesses:
S. H. NOURSE,
JESSIE C. BRODIE.